United States Patent
Wu et al.

[11] Patent Number: 6,113,284
[45] Date of Patent: Sep. 5, 2000

[54] OPTICAL FIBER LIGHT SOURCE ASSEMBLY AND MANUFACTURING METHOD FOR THE SAME

[75] Inventors: Yuying Wu; Mitsuo Takahashi, both of Matsudo, Japan

[73] Assignee: Seikoh Giken Co., Ltd., Matsudo, Japan

[21] Appl. No.: 09/108,501

[22] Filed: Jul. 1, 1998

[30] Foreign Application Priority Data

Feb. 3, 1998 [JP] Japan .................................. 10-036679

[51] Int. Cl.[7] ...................................................... G02B 6/42
[52] U.S. Cl. ................................................. 385/92; 385/90
[58] Field of Search .................................. 385/88, 90–94, 385/34

[56] References Cited

U.S. PATENT DOCUMENTS

| | | | |
|---|---|---|---|
| 4,307,934 | 12/1981 | Palmer | 385/93 |
| 5,189,716 | 2/1993 | Matsubara et al. | 385/93 |
| 5,212,752 | 5/1993 | Stephenson et al. | 385/78 |
| 5,379,360 | 1/1995 | Ota et al. | 385/59 |
| 5,668,905 | 9/1997 | Takahashi et al. | 385/78 |

FOREIGN PATENT DOCUMENTS

| | | |
|---|---|---|
| 0 278 507 | 8/1988 | European Pat. Off. . |
| 0 441 403 | 8/1991 | European Pat. Off. . |
| 2234088 | 1/1991 | United Kingdom . |

*Primary Examiner*—John D. Lee
*Assistant Examiner*—Sarah U Song
*Attorney, Agent, or Firm*—Venable; Robert J. Frank; Gabor J. Kelemen

[57] ABSTRACT

An optical fiber light source assembly is constructed by assembling a light emitting device, a condenser lens, and a ferrule receptacle means for receiving an optical fiber ferrule in a housing. The ferrule receptacle means is adjusted on its optical axis in relation to the housing and is then fixed to the housing. The ferrule receptacle is guided in the housing along a pair of engaged reference circumferences therebetween, and is moved back and forth through a screw connection while being turned. After a reference front end position of an inserted ferrule is made coincident with the image point of the light source, the ferrule receptacle means is fixed in the housing using fixing means. An adjusting instrument is used to adjust the position of the ferrule receptacle means in relation to the housing.

8 Claims, 4 Drawing Sheets

A—A

OPTICAL FIBER LIGHT SOURCE ASSEMBLY AND MANUFACTURING METHOD FOR THE SAME

BACKGROUND OF THE INVENTION

1. Field of the Invention

The present invention relates to an optical fiber light source assembly and a manufacturing method thereof. More particularly, the optical fiber light source assembly includes a light source, a condenser lens, ferrule receptacle means for receiving an optical fiber ferrule, and a housing that assembles therewithin these components in that order from front to back. The manufacturing method permits the ferrule receptacle means to be adjustably moved in an axial direction of the housing.

2. Description of the Related Art

The coupler of a light source and an optical fiber is known to couple an optical fiber ferrule to an optical light assembly into which an optical fiber and a condenser lens are assembled.

As disclosed in U.S. Pat. Nos. 5,588,081 and 5,631,992, the inventors of this invention have proposed an optical fiber coupler device in which a gradient index (GRIN) lens converges a light beam from a light source, such as a can-type LED or a semiconductor laser, supported in a housing and an optical fiber supported by a ferrule is placed at a point of convergence of the light beam.

To enhance the coupling efficiency of such an optical fiber coupler device between the light source and the optical fiber, the light source, the condenser lens, and the center of the receiving end surface of the optical fiber have to be colinearly aligned (coaxial property) and the image of a point light source has to coincide with the center of the receiving end surface of the optical fiber (focusing). Failure to meet either of the two conditions lowers the coupling efficiency.

When a light emitting diode (LED) or a laser diode is used as a light source, variations in a light point (the position of the point light source) and the shape of a window plate give rise to the need for focusing. In a first method available for focusing, an optical fiber ferrule is fitted into a sleeve to the light source side, is brought into focus by sliding, and is then fixed with a setscrew, as described in the related art disclosed in each of the above-cited United States patents.

In a second method contemplated, a washer for adjusting spacing is placed between a light source side assembly and an optical fiber ferrule receptacle for focusing.

In a third method, an optical fiber ferrule receptacle is connected to a light source side assembly through a screw connection along the optical axis as a central axis to adjust the distance therebetween.

Since the diameter of the core of each optical fiber is as small as 9 μm, it is occasionally required that the light point of the light source, the optical axis of the lens, and the central axis of the optical fiber core supported by the ferrule be aligned with each other. A light emitting device holder, a condenser lens holder and a ferrule holder are arranged and adjusted for precise optical axis alignment, and the coupling end surfaces of each holder are then fixed to each other through laser welding. Optical axis alignment is assured by measuring the output of the optical fiber coupled to the ferrule holder to determine a maximum output position.

The first method requires that each optical fiber ferrule be secured with a setscrew after focusing is performed on a ferrule by ferrule basis.

In the second method, the washer (annular ring spacer) for adjusting spacing is placed between the light source side assembly and the optical fiber ferrule receptacle to adjust the distance therebetween. The selection and mounting of the annular ring spacer are complicated, and the adjustment of the spacer needs to be performed in a stepwise fashion, and possibly causes the optical axis misalignment.

The third method also possibly gives rise to an offset between the central axes. For the alignment of the central axes, the light emitting device holder, the condenser lens holder and the ferrule holder may be handled separately, a reference surface of a ferrule end is defined in the ferrule holder, and one of the second and third methods may be used in combination. The alignment operation involved, however, becomes complex and needs an expensive aligning welding machine.

SUMMARY OF THE INVENTION

Accordingly, it is a primary object of the present invention to provide an optical fiber light source assembly with a structure that prevents an offset between the central axes of a light emitting device, a condenser lens, and the ferrule holder in the course of determination of a reference position of a ferrule holder so that the need for alignment operations of the central axes is practically eliminated.

It is another object of the present invention to provide a manufacturing method for manufacturing the assembly using a novel adjusting instrument.

In order to achieve the above objects, there is provided an optical fiber light source assembly comprising a light emitting device, a condenser lens, ferrule receptacle means for receiving an optical fiber ferrule, and a housing that supports the light emitting device, the condenser lens, and the ferrule receptacle means in the order quoted herein, wherein the position of the ferrule receptacle means is adjusted in the direction of the optical axis of the housing before the ferrule receptacle means is fixed and wherein the housing comprising: a reference inner diameter that defines a cylindrical guide surface substantially coaxial with hole portions for receiving the light emitting device and the condenser lens, and an internal thread coaxial with the reference inner diameter; and the ferrule receptacle means comprising: a central bore that transmits therethrough a light beam condensed through the lens at the center, a receptacle hole for defining the central axis and the reference end position of the ferrule that is coaxially engaged with the central bore to receive the ferrule, an external thread on the outer circumference to be screwed into the internal thread of the housing, and a reference outer diameter coaxial with the external thread and defining a cylinder that is precisely engaged with the reference inner diameter of the housing, wherein the ferrule receptacle means is rotated to advance back and forth through the screw connection while being guided along the engaged reference inner and outer diameter within the housing, and is fixed to the housing by fixing means after the reference end position of the ferrule is set to coincide with the image point of the light source.

In the optical fiber light source assembly, the ferrule receptacle means comprises both a ferrule stopper and a ferrule holder coaxially arranged therewithin in the order quoted herein and wherein the ferrule stopper comprising the central bore that receives at the center the light beam condensed through the condenser lens, the external thread on the outer circumference to be screwed in the internal thread of the housing, and on the rear end a surface that defines the front end position of the ferrule to be received; and the ferrule holder comprising the receptacle hole for defining and receiving the central axis of the ferrule that is coaxially engaged with the central bore, and a reference cylindrical circumference that is precisely inserted into the reference inner diameter of the housing.

In the optical fiber light source assembly, the outer diameter of a support of the light source of the housing, the diameter of a support of the lens, and the reference diameter circumference in the housing are machined to be coaxial with the optical axis of the lens supported by the lens support of the housing.

In the optical fiber light source assembly, the light source is a point light source, including an light emitting diode or laser diode, and the lens is a converging optical system, including an optical lens or a gradient index lens.

In order to achieve the above objects, there is provided a manufacturing method of an optical fiber light source assembly comprising a light emitting device, a condenser lens, ferrule receptacle means for receiving an optical fiber ferrule, and a housing that supports the light emitting device, the condenser lens, and the ferrule receptacle means in the order quoted herein, wherein the position of the ferrule receptacle means is adjusted in the direction of the optical axis of the housing before the ferrule receptacle means is fixed, the method comprising: the step of connecting the light source and the condenser lens to the housing, the step of connecting the ferrule receptacle means to the housing in such a manner that the ferrule receptacle means is axially movable relative to the housing, the step of connecting to the ferrule receptacle means an adjusting instrument, detachably engaged with and integrally rotatable with the ferrule receptacle means, for supporting an optical fiber to which a light beam from the light source is coupled through the lens, the step of determining the position of the ferrule receptacle means for a maximum output of the optical fiber, wherein the output of the optical fiber is measured by measuring means while the optical fiber ferrule supporting adjusting instrument is rotated with the light source operated, and the step of fixing the ferrule receptacle means.

In the manufacturing method of an optical fiber light source assembly, the front end surface of a ferrule holder supporting the optical fiber ferrule of the adjusting instrument is detachably engaged with the rear end surface of the ferrule receptacle means and the ferrule receptacle means is axially moved back and forth relative to the housing while the ferrule holder is turned.

In the manufacturing method of an optical fiber light source assembly, the engagement of the front end surface of the ferrule holder of the adjusting instrument with the rear end surface of the ferrule receptacle means is achieved by a connection of a groove and a projection.

In the manufacturing method of an optical fiber light source assembly, the measuring means is an optical power meter connected to the other end of the optical fiber of the adjusting instrument, which is a coupling device connected between the light source and the optical fiber.

DESCRIPTION OF THE PREFERRED EMBODIMENTS

Figure 1:
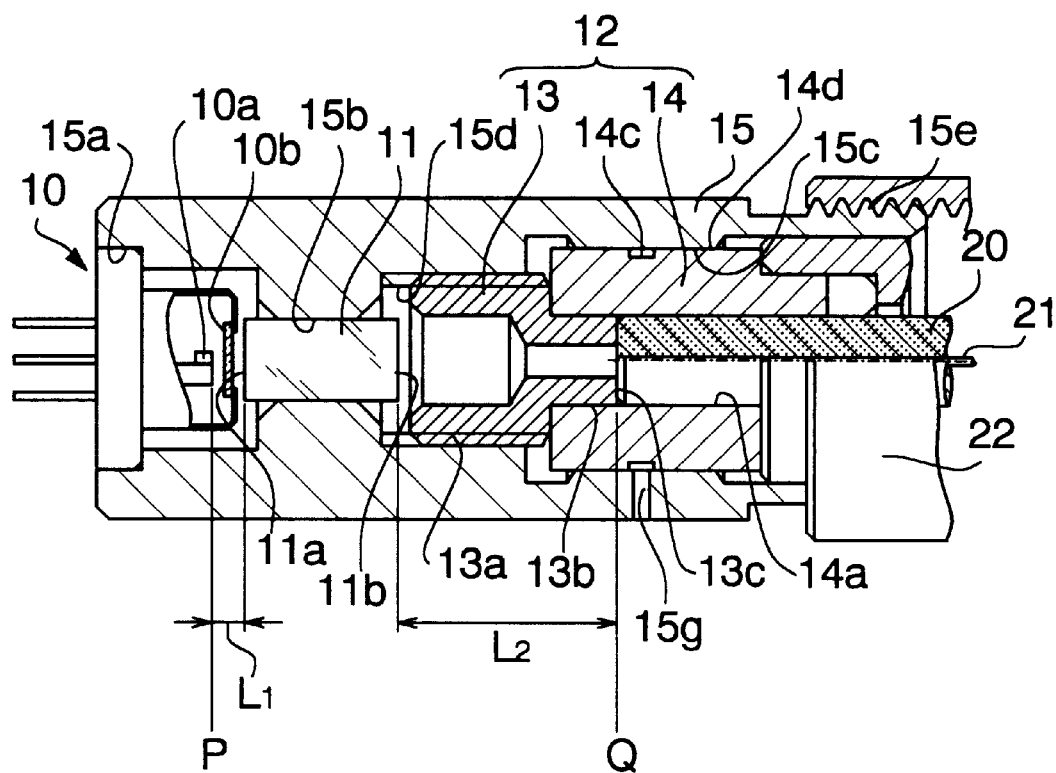
FIG. 1 is a longitudinal sectional view of a first embodiment of an optical fiber light source assembly of the present invention in its operational state.

Referring now to the drawings, the embodiments of the present invention are discussed.

FIG. 1 is a longitudinal sectional view of a first embodiment of an optical fiber light source assembly of the present invention in its operational state, wherein an optical fiber ferrule is connected to the optical fiber light source assembly.

The optical fiber light source assembly is constructed by assembling a light emitting device 10, a condenser lens 11 constructed of a cylindrical gradient index (GRIN) lens, and ferrule receptacle means 12 for receiving an optical fiber ferrule in a housing 15 in that order from the side of the light source.

For the convenience of machining, the ferrule receptacle means 12 is constructed by connecting a ferrule stopper 13 and a ferrule holder 14 in a unitary body. The end surface of an optical fiber 21 supported by an optical fiber ferrule 20, namely the end surface of the optical fiber ferrule 20, is pressed into contact with the reference surface (denoted by Q) of the ferrule receptacle means 12 for coupling. The light beam from the light point on a surface P of the light emitting device 10 is focused to form an image of the light source on the surface Q through the condenser lens 11. $L_1$ denotes the distance between the light point and the entrance (front) surface of the condenser lens 11, and $L_2$ denotes the distance between the exit (rear) surface of the condenser lens 11 and the position of an image. A maximum optical coupling is achieved by placing a surface 13c of the ferrule stopper 13 of the ferrule receptacle means 12 by $L_2$ apart in the light source assembly of the present invention.

Figure 2:
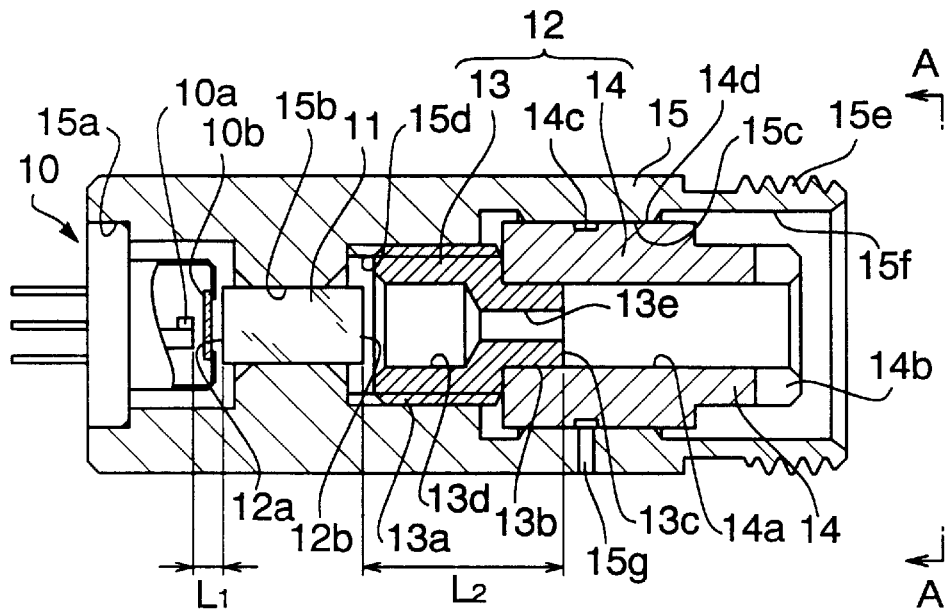
FIG. 2 is a sectional view of the light source assembly of the present invention.
Figure 3:
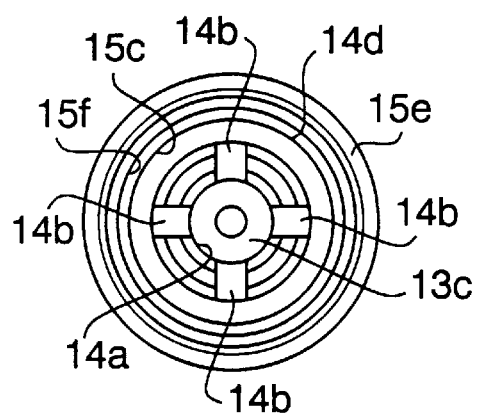
FIG. 3 is a view of the embodiment of FIG. 2, viewed from the side of a ferrule receptacle side.

FIG. 2 is a sectional view of the light source assembly of the present invention, and FIG. 3 is a view of the embodiment of FIG. 2, viewed from the side of the ferrule receptacle means.

The light source 10 is a can-type LED, its element 10a is hermetically sealed in a can, and its light beam is emitted through a glass window 10b in an optical axis. A laser diode or other light source devices may also be used for the light source. To couple the light emission efficiently, the area of the light source is preferably small.

Employed as the condenser lens is a GRIN lens 11 known for its high focal power. As long as its focal power is sufficiently strong, any optical system may work. For example, a spherical single lens, a combination lens or an aspherical lens may be acceptable. When the light source is elliptic, a lens for converting it into a circular beam may be used.

The housing 15 is formed by machining a metal bar. The housing 15 has, precisely coaxially from one side, a fitting bore 15a for receiving a base flange of the light emitting device 10 and a mounting bore 15b for receiving the condenser lens 11. The housing 15 has further, precisely coaxially from the other side, an alignment bore (reference inner diameter) 15c to be engaged with the ferrule holder 14 constituting the ferrule receptacle means 12 and an internal thread 15d. While the outer of the housing 15 is held by chuck, the reference inner diameter 15c and the internal thread 15d are machined, and then the inner diameter of the light source receptacle stepped bore 15a and the lens receptacle bore 15b are finish machined. This makes the centers of the bores 15a, 15b, 15c precisely coaxial.

The ferrule receptacle means 12 includes the ferrule stopper 13 and the ferrule holder 14, both integrated into a unitary body as already described. The ferrule stopper 13 has on one side an external thread 13a that is screwed into the internal thread 15d of the housing 15. The ferrule stopper 13 has through bores 13d and 13e, and a portion 13b of the ferrule stopper 13 is precisely fitted into a bore 14a of the ferrule holder 14.

The ferrule holder 14 has a reference outer diameter 14d that is precisely coaxially fitted into the alignment bore (reference inner diameter) 15c of the housing 15. The ferrule holder 14 has a slightly smaller diameter portion next to the reference outer diameter 14d, and crossing grooves 14b on its receptacle end surface receiving a connector with an optical fiber ferrule. The housing 15 has a slightly larger inner diameter portion 15f next to the reference inner diameter 15c, and has an inner beveled face in its opening portion.

The housing 15 has a thread 15e, on its outer circumference corresponding to its inner diameter 15f, to be mated with the optical fiber ferrule connector. As shown in FIG. 1, the end surface of the inserted connecter is pressed into contact with the surface 13c shown in FIGS. 2 and 3.

Referring to FIG. 2, the housing 15 has a plurality of small holes 15g on its barrel. The ferrule receptacle means 12 has a groove 14c on its reference outer diameter 14d in a position corresponding to the holes 15g.

The manufacturing method of the light source assembly is now discussed. The ferrule stopper 13 is fitted into and secured in the inner bore of the ferrule holder 14 to construct the ferrule receptacle means 12.

The condenser lens 11 is inserted into the lens alignment bore 15b from the one side of the housing 15, and the light emitting device 10 is inserted and held in the fitting bore 15a. An adhesive agent is then applied to the side of the condenser lens 11, and the condenser lens 11 is drawn to the end surface of the light emitting device 10 and is secured there by gluing.

The ferrule receptacle means 12 is inserted into the housing 15 from its side receiving the optical connector.

The screw of the ferrule stopper 13 is hand-tightened by using an adjusting instrument to be described below so that the precise outer diameter of the ferrule holder 14 is slid along the alignment bore of the housing while coaxial property along the optical axis is maintained.

Figure 4:
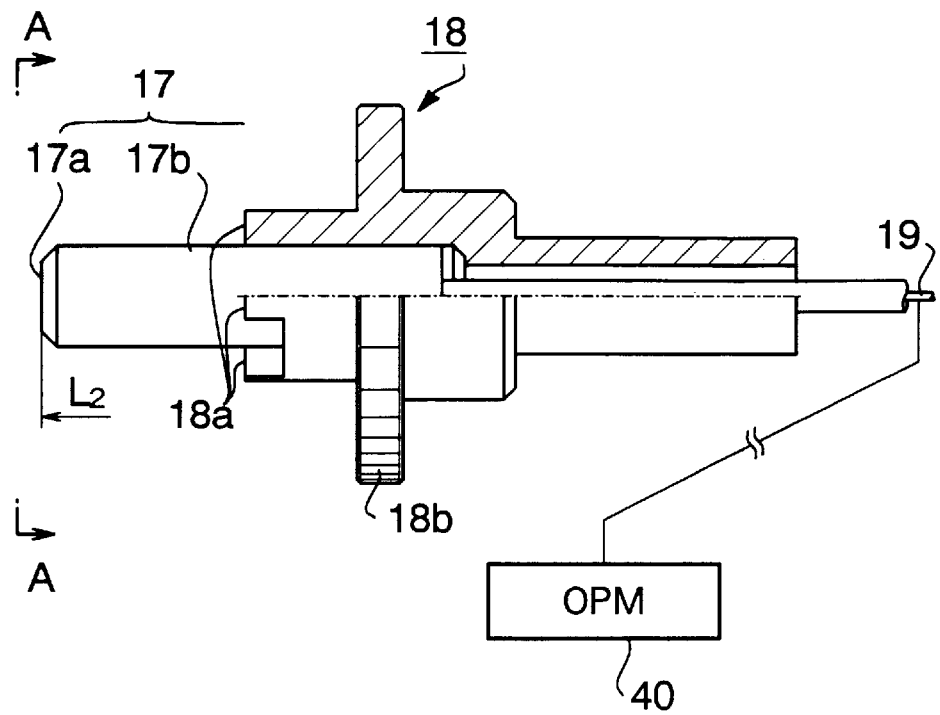
FIG. 4 shows an adjusting instrument with a portion longitudinally broken away, which is used in the manufacturing process of the light source assembly of the present invention.
Figure 5:
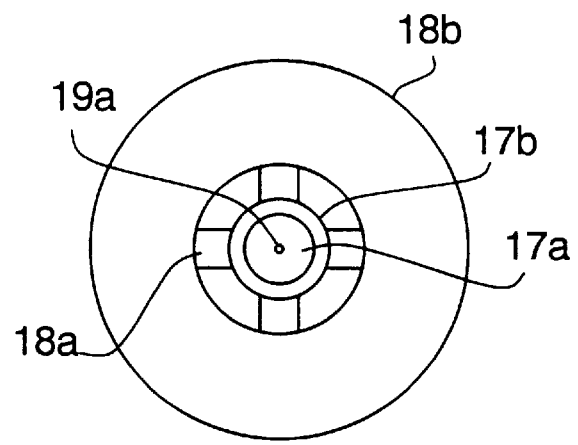
FIG. 5 is an end view of the adjusting instrument of FIG. 4, viewed from the left-hand side A—A.

FIG. 4 shows an adjusting instrument with a portion longitudinally broken away, which is used in the manufacturing process of the light source assembly of the present invention, and FIG. 5 is an end view of the adjusting instrument of FIG. 4, viewed from the left-hand side A—A.

A ferrule holder 18, which is the adjusting holder, connects an optical fiber 19 to a ferrule 17 having an end shape identical to that of the ferrule used in the ferrule receptacle means 12 in the above-described light source assembly. Referring to FIG. 4, the other end of the optical fiber 19 is connected to an optical power meter OPM 40. The end of the adjusting ferrule holder 18 is provided with crossing projections 18a. The ferrule holder 18 has a flange portion 18b. Gripping the flange portion 18b, an operator inserts the ferrule 17 into the bore 14a of the ferrule receptacle means 12 in the housing 15 in such a manner that the crossing projections 18a are mated with the crossing grooves 14b, and then turns the ferrule 17. A reference end surface 17a of the ferrule 17 is pressed into contact with the surface 13c as shown in FIGS. 2 and 3.

When the operator turns clockwise or counterclockwise the adjusting instrument with the housing 15 held, the optical-fiber ferrule receptacle means 12 is moved back and forth while being turned in the housing 15. Since the reference inner diameter 15c of the housing 15 and the reference outer diameter 14d of the optical-fiber ferrule receptacle means 12 are precisely engaged, the optical-fiber ferrule receptacle means 12 suffers no runout. As a result, the core of the optical fiber 19 moves along its correct axis. With the light emitting device 10 kept lit, the optical power meter OPM 40 gives a maximum output when the light flux density in the core of the optical fiber 19 is maximized, namely when the waist diameter of the optical beam is minimized. The optical power meter OPM 40 gives a maximum output when the waist of the light beam falls within the mode field diameter of the optical fiber. At its optimum receiving position, the assembly is fixed by applying the adhesive agent into the groove 14c provided in the outer circumference of the ferrule holder 14 through any of the plurality of small holes 15g provided in the barrel of the housing 15.

The above embodiment is of a particularly simple construction, and is low cost to build. However, there will be times when a great offset takes place between the position of the light point of the light source and the reference position of the light source, requiring adjustment of the lens and the optical axis of the optical-fiber ferrule. Reference is made to the above-cited U.S. Pat. No. 5,588,081 which details the cause for offsets. In such an extreme case of offset, axial alignment operations are separately made, one between the lens and the ferrule receptacle means 12 and the other between the light source and the lens support, before the housing 15 is assembled.

Figure 6:
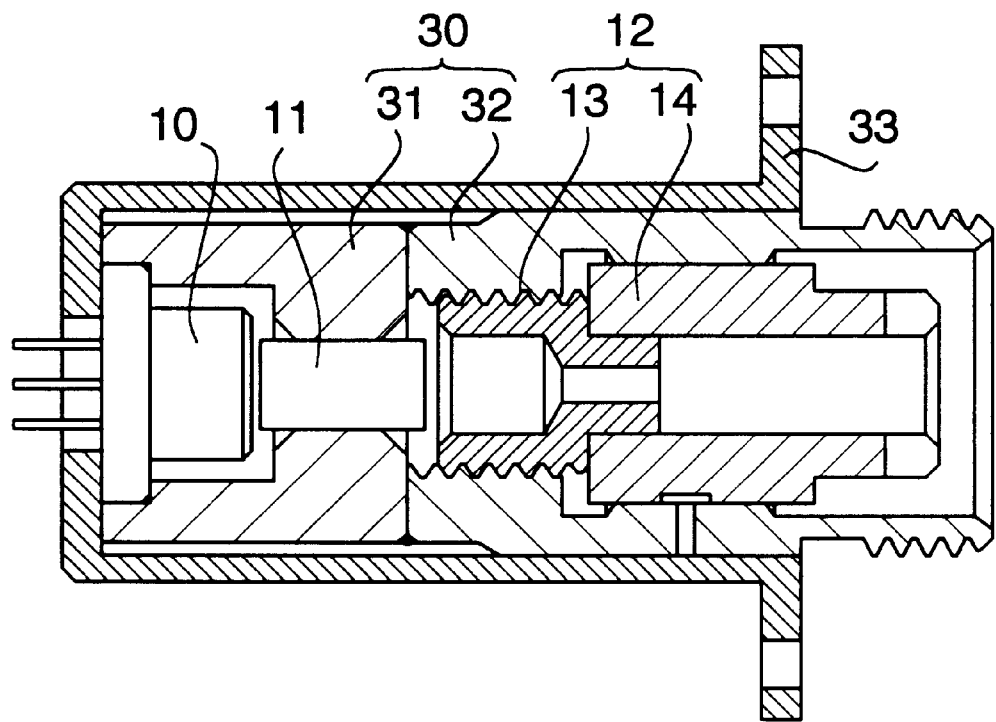
FIG. 6 is a longitudinal sectional view of a second embodiment of the optical fiber light source assembly of the present invention.

FIG. 6 shows a second embodiment which allows the axis alignment adjustment between the lens and the ferrule receptacle means 12 to be separately made from the axis alignment adjustment between the light source and the lens support in the housing 15. The optical fiber light source assembly comprises a light emitting device 10, a condenser lens 11, a lens holder 31, optical-fiber ferrule receptacle means 12 (including a threaded ferrule stopper 13 and a ferrule holder 14), and a housing 32. The light emitting device 10 and the condenser lens 11 are mounted and secured in the lens holder 31.

The ferrule stopper 13 is fitted into and secured in the ferrule holder 14 to construct the optical-fiber ferrule receptacle means 12. The ferrule receptacle means 12 is then inserted into the housing 32 to be mated with an internal thread of the housing 32. The ferrule stopper 13 of the ferrule receptacle means 12 is turned until it comes to an appropriate position in relation to the housing 32.

The lens holder 31 having the light emitting device 10 and the condenser lens 11 mounted thereon is precisely aligned in optical axis with the housing 32 having the ferrule stopper 13 and the ferrule holder 14 mounted thereon. Then, the lens holder 31 and the housing 32 are connected with their interface ends welded through laser welding. The ferrule stopper 13 is adjusted for its optimum position on the optical axis using the instrument shown in FIGS. 4 and 5 in the same manner as already described, and is then secured. Thereafter a cylinder 33 with a flange is fitted around them to complete the production of the assembly.

As already described, the light source assembly is constructed by assembling the light emitting device, the condenser lens, and the ferrule receptacle means for receiving the optical-fiber ferrule in that order from the slight source side in the housing, wherein the ferrule receptacle means is adjusted for its position on the optical axis in relation to the housing.

The ferrule receptacle means, before being fixed, is guided into the housing along the pair of engaged reference circumferences therebetween so that the ferrule receptacle means suffers no runout. This arrangement permits a precise adjustment. A lens and a light source are adjusted in their central axis alignment as necessary, though an ordinary combination of lens and light source needs no such adjustment.

In the adjustment of the light source assembly, the rotary instrument, working also as a measuring instrument, permits easy and optimum adjustment.

What is claimed is:

1. An optical fiber light source assembly comprising a light emitting device, a condenser lens, ferrule receptacle means for receiving an optical fiber ferrule, and a housing that supports the light emitting device, the condenser lens, and the ferrule receptacle means in that order, wherein the position of the ferrule receptacle means is adjusted in the direction of the optical axis of the housing before the ferrule receptacle means is fixed, the housing comprising:
   a reference inner diameter that defines a cylindrical guide surface substantially coaxial with hole portions for receiving the light emitting device and the condenser lens, and
   an internal thread coaxial with the reference inner diameter; and
   the ferrule receptacle means comprising:
   a central bore that transmits therethrough a light beam condensed through the lens at the center thereof,
   a receptacle hole for defining the central axis and the reference end position of the ferrule that is coaxially engaged with the central bore to receive the ferrule,
   an external thread on an outer circumference of the ferrule receptacle means to be screwed into the internal thread of the housing, and
   a reference outer diameter coaxial with the external thread and defining a cylinder that is precisely engaged with the reference inner diameter of the housing,
   wherein the ferrule receptacle means is rotatable to advance back and forth through the screw connection to adjust the reference end position relative to the housing while being guided along the engaged reference inner and outer diameter circumferences within the housing, and wherein the assembly further comprises a fixing means for fixing the ferrule receptacle means to the housing after the reference end position of the ferrule is set to coincide with the image point of the light source.

2. An optical fiber light source assembly according to claim 1, wherein the ferrule receptacle means comprises both a ferrule stopper and a ferrule holder coaxially arranged therewithin in that order,
   the ferrule stopper comprising the central bore that receives at the center the light beam condensed through the condenser lens, the external thread on the outer circumference to be screwed in the internal thread of the housing, and on the rear end a surface that defines the front end position of the ferrule to be received; and
   the ferrule holder comprising the receptacle hole for defining and receiving the central axis of the ferrule that is coaxially engaged with the central bore, and a reference cylindrical circumference that is precisely inserted into the reference inner diameter of the housing.

3. An optical fiber light source assembly according to claim 1, wherein the outer diameter of a support of the light source of the housing, the diameter of a support of the lens, and the reference diameter circumference in the housing are machined to be coaxial with the optical axis of the lens supported by the lens support of the housing.

4. An optical fiber light source assembly according to claim 1, wherein the light source is a point light source, including an light emitting diode or laser diode, and the lens is a converging optical system, including an optical lens or a gradient index lens.

5. A manufacturing method of an optical fiber light source assembly comprising a light emitting device, a condenser lens, ferrule receptacle means for receiving an optical fiber ferrule, and a housing that supports the light emitting device, the condenser lens, and the ferrule receptacle means in that order, wherein the position of the ferrule receptacle means is adjusted in the direction of the optical axis of the housing before the ferrule receptacle means is fixed, the method comprising the steps of:
   connecting the light source and the condenser lens to the housing;
   connecting the ferrule receptacle means to the housing in such a manner that the ferrule receptacle means is axially movable relative to the housing by rotation of the ferrule receptacle means;
   connecting to the ferrule receptacle means an adjusting instrument, detachably engaged with and integrally rotatable with the ferrule receptacle means, for supporting an optical fiber to which a light beam from the light source is coupled through the lens;
   determining the end position of the ferrule receptacle means for a maximum output of the optical fiber, wherein the output of the optical fiber is measured by measuring means while the optical fiber ferrule supporting adjusting instrument is rotated to advance the ferrule receptacle means back and forth with the light source operated; and
   fixing the ferrule receptacle means.

6. A manufacturing method of an optical fiber light source assembly according to claim 5, wherein a front end surface of a ferrule adjusting holder of the adjusting instrument supporting the optical fiber ferrule is detachably engaged with a rear end surface of the ferrule receptacle means and the ferrule receptacle means is axially moved back and forth relative to the housing while ferrule adjusting holder is rotated.

7. A manufacturing method of an optical fiber light source assembly according to claim 6, wherein the engagement of the front end surface of the ferrule adjusting holder with the rear end surface of the ferrule receptacle means is achieved by a connection of a groove and a projection.

8. A manufacturing method of an optical fiber light source assembly according to claim 5, wherein the measuring means is an optical power meter connected to a distal end of the optical fiber of the adjusting instrument, which is a coupling device connected between the light source and the optical fiber.

* * * * *